Feb. 16, 1926.                                                                1,573,300
                          R. N. CHAMBERLAIN
                           STORAGE BATTERY
                         Filed March 24, 1922

INVENTOR
Rufus N. Chamberlain
by Byrnes Stebbins Burgess & Parmelee
his Attorneys Patented Feb. 16, 1926.

1,573,300

UNITED STATES PATENT OFFICE.

RUFUS N. CHAMBERLAIN, OF CHICAGO, ILLINOIS, ASSIGNOR, BY MESNE ASSIGNMENTS, TO GOULD STORAGE BATTERY COMPANY INC., OF NEW YORK, N. Y., A CORPORATION OF NEW YORK.

STORAGE BATTERY.

Application filed March 24, 1922. Serial No. 546,402.

*To all whom it may concern:*

Be it known that I, RUFUS N. CHAMBERLAIN, a citizen of the United States, residing at Chicago, county of Cook, State of Illinois, have invented a new and useful Improvement in Storage Batteries, of which the following is a full, clear, and exact description.

My invention relates to storage batteries and particularly to the arrangement and construction of the separators and plates which cooperate in the battery. It is well known that during the operation of storage batteries the plates become warped and buckled. This results from many causes. Usually the plates buckle in such a way as to cause the two outer edges to press against one separator and the protruding buckled intermediate part to press against the center of the separator on the other side of the plate. Wood separators as ordinarily constructed are provided with vertical ribs of the same width spaced arbitrarily across the face of the separator. With such separators the buckling of the plates crushes the intermediate rib or ribs which results in short circuits and other troubles.

I have devised a separator which overcomes the above difficulties and produces many advantages. My separator is provided with wide ribs at the edges and at least one wide rib intermediate the edges, preferably at the center. These wide ribs are of sufficient mechanical strength and endurance by reason of their volume to hold the plates so as to prevent buckling to a large extent. They also resist the action of the acid sufficiently to materially increase the life of the separator and therefore that of the battery. In addition to the wide ribs my separator is provided with narrower ribs intermediate the wide ribs. The intermediate ribs vary in width and are so spaced apart that the wider of these ribs coincide with the ribs on the cast grid of the plate.

My invention will be better understood by reading the following description in connection with the accompanying drawing, in which—

Figure 1:
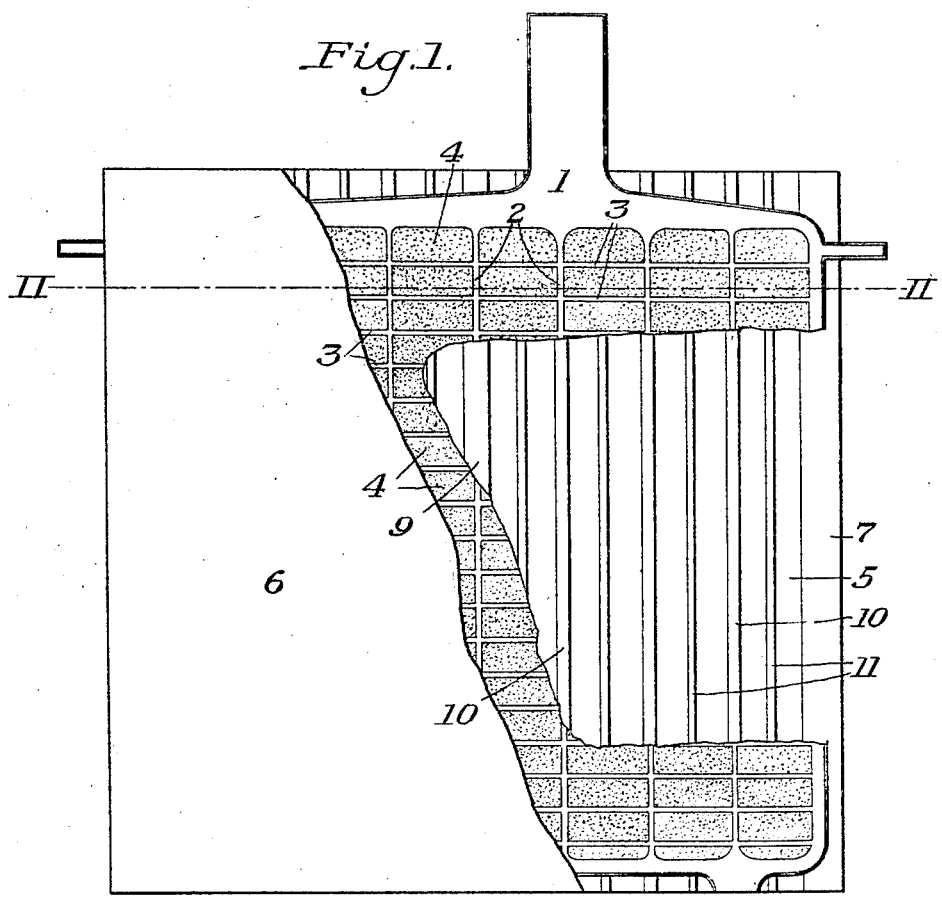
Figure 2:
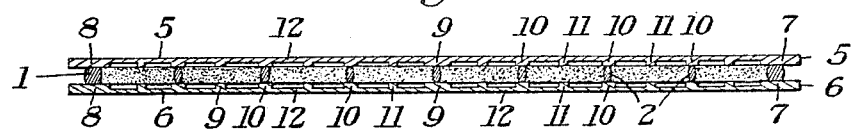

Figure 1 is a side elevation of a plate with a separator on each side thereof, one of the separators and the plate being broken away to show the relation of the parts, and Figure 2 is a section on line II—II of Figure 1.

Referring to the drawings the plate 1 may be of any usual construction. The plate shown is of the cast grid type and has longitudinal or vertical ribs 2 and horizontal ribs 3. Between the ribs 2 and 3 are spaces which are filled in with pellets of active material 4 usually in the form of a paste. Placed on the opposite sides of the plate 1 are separators 5 and 6. These separators are provided with wide ribs 7 and 8 at their vertical edges and a wide rib 9 intermediate the ribs 7 and 8. Narrower ribs are placed between the ribs 7 and 9 and 8 and 9. The ribs 10 are wider than the ribs 11 and the ribs 10 are so spaced apart as to coincide with the vertical ribs 2 of the plate 1. The ribs 11 pass across the face of the pellets 4 and act to hold the pellets in place but do not materially affect the action of the electrolyte on the active material. Between the ribs the separators are provided with the usual web 12.

My invention has many advantages, among which may be mentioned that the wide ribs at the edges of the separators and intermediate the edges act to prevent buckling to a large extent and if the plates buckle these ribs are of sufficient mechanical strength to withstand the effect of the buckling; the wide center rib gives stronger and safer insulation and greatly increases the life of the separator under all conditions; the arrangement wherein the ribs coincide or register with the ribs of the grid greatly strengthens the plates, thus giving a strong mechanical separation; the narrower ribs passing across the face of the pellets hold them in position and at the same time, do not materially affect the action of the electrolyte on the active material.

While I have shown and described in detail one form of separator and grid, I wish it to be understood that I am not to be limited to the exact arrangement shown and described, as many changes may be made in the details of the grid or separator or both, without departing from the spirit of my invention.

I claim:

1. The combination with a battery plate having longitudinal ribs of a separator having a rib coinciding with each of the ribs of the plate and narrower ribs intermediate the other ribs, and acting to hold the pellets of active material in place, substantially as described.

2. The combination with a battery plate having vertical ribs of a separator having wide ribs on its vertical edges, a wide rib intermediate the edge ribs and narrow ribs between said intermediate ribs and said edge ribs, each of said wide ribs coinciding with the ribs on said plate, substantially as described.

3. The combination of a wood separator having alternate wider and narrower ribs with a storage battery plate having longitudinal ribs, each of the ribs of the battery plate coinciding with one of the said wider ribs of the separator.

4. The combination of a separator with a pasted storage battery plate, wide ribs at the edges of said separator and a wide rib on said separator intermediate its edges, ribs on said plate coinciding with said separator ribs and intermediate coinciding ribs on the plate and separator, the said latter separator ribs being narrower than the first mentioned separator ribs.

In testimony whereof I have hereunto set my hand.

RUFUS N. CHAMBERLAIN.